United States Patent [19]

Burgess et al.

[11] Patent Number: 4,865,817
[45] Date of Patent: Sep. 12, 1989

[54] GAS REACTING APPARATUS

[75] Inventors: J. Stuart Burgess, London; Donald R. Spink, Waterloo; Jerry Y. Stein, Thornhill, all of Canada

[73] Assignee: University of Waterloo, Waterloo, Canada

[21] Appl. No.: 20,953

[22] Filed: Mar. 2, 1987

[51] Int. Cl.[4] .............................................. C01B 17/00
[52] U.S. Cl. .................................... 422/168; 422/169; 422/170; 422/172; 422/189; 422/193; 422/194; 422/257; 422/259; 422/273; 422/281; 55/257.1; 55/258; 55/408; 261/117
[58] Field of Search ............................... 422/168–170, 422/172, 188, 189, 193, 194, 257, 259, 273, 281; 55/257.1 X, 258 X, 408 X; 261/117 X, 24, 50

[56] References Cited

U.S. PATENT DOCUMENTS

| | | | |
|---|---|---|---|
| 4,272,499 | 6/1981 | Cason et al. | 422/168 X |
| 4,374,813 | 2/1983 | Chen et al. | 261/117 X |
| 4,484,937 | 11/1984 | James et al. | 55/257.1 X |
| 4,530,822 | 7/1985 | Ahsley et al. | 422/169 X |

Primary Examiner—Barry S. Richman
Assistant Examiner—Lynn M. Kummert
Attorney, Agent, or Firm—Sim & McBurney

[57] ABSTRACT

Gas reacting apparatus and method are described for wet mass transfer of solute gases from a gas stream with a liquid or slurry reacting medium capable of chemisorption of solute gases in the gas stream. The apparatus comprises an elongated conduit means defining a primary reaction zone in fluid-flow communication with a fan means defining both a secondary reaction zone and a spray coalescence zone, and plurality of dual fluid spray means coaxially spaced in series within the conduit means and countercurrently or cocurrently directed to the gas stream for spraying the liquid or slurry reacting medium into said conduit means to form a plurality of spray contact zones of uniformly-distributed fine droplets wherein intimate contact of high interfacial surface area between the sprayed liquid or slurry and the gas stream is effected to remove solute gases from the gas stream. The fan is operated at a relatively low speed to promote coalesence of droplets through droplet-droplet collisions followed by collection on the fan blades with liquid or slurry layers which, under the action of centrifugal forces, are separated in the form of an attendant annular spray zone of relatively large droplets to trap more of the solute gases. The droplets upon impingement on the fan casing are collected and removed by gravity, while the clean gas stream is exhausted from the fan casing. The apparatus may also include quenching means for saturating and cooling the gas stream prior to the removal of solute gases as well as an entrainment separator for further removing entrained droplets not separated by the fan means from the clean gas stream.

3 Claims, 4 Drawing Sheets

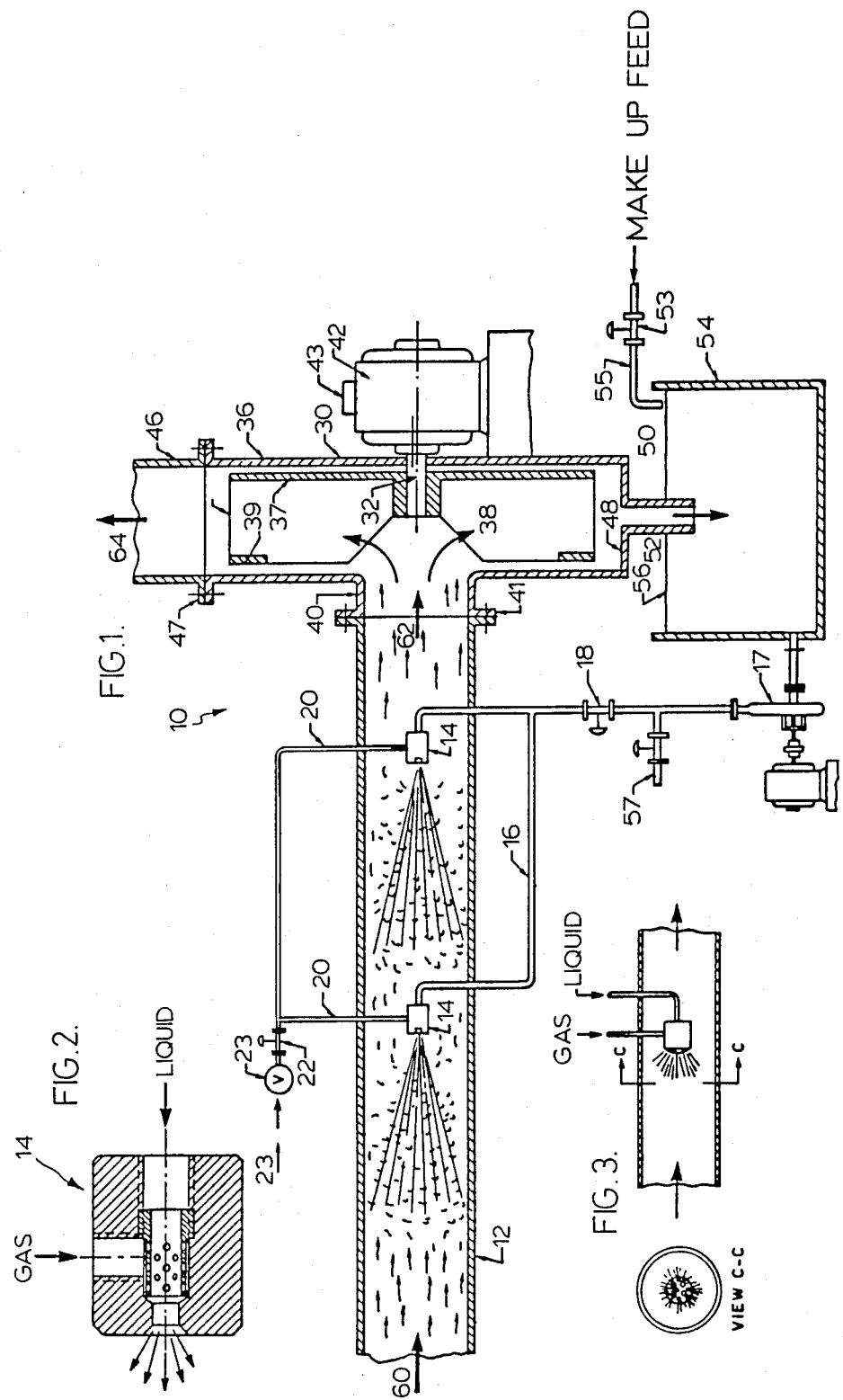

GAS REACTING APPARATUS

FIELD OF INVENTION

This invention relates to gas/liquid, gas/liquid/solid and gas/gas/liquid mass transfer, and more particularly to a mechanically-aided gas reacting apparatus and method for mass transferring solute gases from an industrial or utility gas stream into a liquid or slurry reacting medium, if necessary in conjunction with simultaneous particulate matter removal, wherein the mass transfer may be a purely physical phenomenon or may involve solution of the solute gas in a liquid or a slurry suspension, followed by chemical reaction with one or more constituents in the liquid or slurry reacting medium. This invention also relates to a gas reacting apparatus for effecting gas-gas reactions in fluid flow communication with an integrated wet separation of the resultant reaction products which are in the form of a finely divided particulate matter. While not limited thereto, the invention is particularly well suited for the removal of $SO_2$ and other gaseous pollutants from waste gas streams such as those emanating from electrical utilities, smelters and industrial boilers.

BACKGROUND OF THE INVENTION

For maximum efficiency, it is desirable to make a gas reacting apparatus wherein a high interfacial surface area coupled with turbulent mixing and long residence time are effected simultaneously and which, as such, is capable of removing both solute gases and particulate matter, either separately or simultaneously with high efficiency, with the former being separated via a gas-liquid, gas-liquid-solid or gas-gas-liquid reaction, depending on the application. To-date, as far as we are aware, there is currently no one type of gas reacting apparatus available that is capable of achieving high performance for all of the above criteria, due to a compromise generally being made between generation of very fine droplets for affecting very high surface area on one hand and long residence time on the other.

One of the methods for separating particulate matter in solid or slurry form from a gas stream wherein a dirty gas stream enters a conduit at one end and is moved through it by a fan at the other end and where a fine spray of liquid, preferably water, is concurrently discharged into such a gas stream upstream from the fan is described in U.S. Pat. No. 4,067,703, issued Jan. 10, 1978. The patent disclosure, while showing a highly-effective method for removal of particulate matter from a gas stream, does not teach how the apparatus can be used as a gas reacting apparatus for removing solute gases. Also, in many aspects, the technique disclosed therein does not provide the absorbing and reacting environment required for effecting high removal efficiency of solute gases. For example, in the foregoing prior art patent, the mixture of gas and particulate matter enters only a single contact spray zone provided by one nozzle in which an atomized liquid spray is injected cocurrent to the dusty air stream flow. While this mode of operation as disclosed has proven to be highly effective for removing particulate matter and effecting lower pressure drop in the apparatus wherein particles were collected primarily by impaction upon the finely-divided water droplets introduced, followed by further agglomeration and impaction on the fan blades as the gas moves through the device, the residence time available for mass transfer is too short and the effective interfacial surface area and turbulence generated by a single contact spray cocurrently oriented to the gas stream are not sufficient to effect high removal efficiencies of solute gases of relatively low solubility in aqueous solution. It is, therefore, desirable to provide for an improved gas reacting apparatus and method which overcome some of the shortcomings of the foregoing prior art apparatus in which increased available residence time, interfacial surface area and turbulence are generated to result in accelerated absorption and reaction kinetics and intimate gas/liquid contact and thus, in high removal efficiency of both solute gas and particulate matter.

While high interfacial surface area, turbulent mixing and long residence time for effecting accelerated mass transfer of solute gases and effectively separating particulate matter are the major criteria in gas reacting apparatus selection, often a compromise must be made between removal efficiency on one hand and operating reliability on the other. Several other factors then also enter into consideration, such as slurry handling without plugging, turndown, and gas and liquid distribution.

The basic processes for removal of solute gases from gas streams, particularly flue gas desulfurization processes, are based on readily-available, low-cost absorbents in the form of an aqueous slurry, such as a lime or limestone slurry, or a clear aqueous solution, such as caustic or ammoniacal solutions. Various prior art methods are in use to bring the above absorbing and reacting media into intimate contact with the pollutant-laden gas. Packed bed and perforated trays, which are known to be efficient gas absorption and reaction devices, are usually the first choice for designers of flue gas desulfurization (FGD) systems, but experience has shown that they are not completely satisfactory. Both perforated trays which bubble the gas through a thin layer of liquid, and packed beds, which pass the gas over solid packing elements that are wetted with the liquid have many narrow passages which are subject to plugging especially if particulate loads are heavy, or if precipitates are formed during the chemisorption process. Such conditions can be minimized by careful process design, but the possibility of scaling under upset conditions still exists and compromises reliability. Another principal disadvantage of both of the above types of scrubbers is their extremely limited turndown capability.

Consequently, heretofore, the gas reacting devices of preference and the ones that would seem to be the answer have been the venturi or open spray tower wherein the internal complexity is low and yet where a relatively large surface area of the liquid is generated per unit volume of gas treated. While the above devices have evolved considerably over the last decade in a way to improve their performance and to remove some of their shortcomings, the current trend in the design particularly of FGD systems, is away from venturis to spray towers or combination towers. The venturi design, although capable of producing a relatively large liquid surface area for contact with the gas stream, was abandoned largely because the very short liquid/gas contact time (attributable largely to the absorbing medium being introduced cocurrently to the gas stream in the throat of the venturi) results in low sulfur dioxide removal. Also, being a relatively high energy device, it is incapable of producing an evenly distributed regime of droplets at high density unless an 'overkill' situation exists wherein excess energy in the form of velocity pressure is added to the gas stream to provide for the required uniform distribution. Spray towers, on the other hand, have few internal components in the gas/liquid contact zone and the use of sprays appears to offer an easy way of increasing the surface area exposed to the gas. However, the sprays are usually introduced at the top of the spray tower and drop by gravity in counter-current flow to the gas stream. To avoid being entrained in the gas stream, the normal size of the droplets sprayed is in the order of 1000 to 2500 microns in diameter. Thus, to increase the surface area exposed to the gas phase and residence time, very high liquid to gas (L/G) ratio and large towers must be employed, all of which substantially increase the capital and annual cost requirement. To effect good gas distribution, a large number of spray nozzles must be used, so that the tower cross-section is uniformly covered with the spray pattern. However, failure of one or two nozzles usually creates a path of least resistance through which the gas can flow, thereby reducing the efficiency of the apparatus.

In addition, the large size of droplets used in spray towers reduces substantially the capability of the apparatus to efficiently remove dust particles in the low particle size range, typically less than 3 microns. With the larger droplets, the decreased gas-liquid surface area can be compensated for by increasing the tower size, the number of spray headers, and circulation rates of the scrubbing liquor, all of which increase the tower space requirement, thereby initial cost and energy consumption. Droplet entrainment and mist elimination, while rather effectively being addressed by the production of larger droplets, can still be the "Achiles heel" of spray tower operation, because it is the only part of the operation where gas flow must be somewhat restricted. These limitations and the fact that the spray and venturi apparatus each offers advantages not shared by both, have given rise to the development of combination gas reacting devices. These combination arrangements generally combine the features of venturi and spray apparatus into one module. These recent designs offer greater performance, allowing high removal efficiency of both gaseous pollutants such as $SO_2$ and particulate matter such as fly ash, but at a very high cost. It is, therefore, desirable to provide an improved gas reacting apparatus which combines all of the advantages offered by venturis and spray towers into one apparatus.

SUMMARY OF THE INVENTION

The problems and disadvantages associated with prior art systems are overcome by the present invention by providing a gas-reacting apparatus and a method which is simple, economical and capable not only of providing good turndown and gas-liquid distribution, but also capable, on the one hand, of generating high turbulence and many fine droplets of an aggregate surface area many times larger than produced in a spray tower of considerably larger size and, on the other hand, of providing for a longer available residence time and higher surface area than in a venturi, thereby effecting high removal efficiency of both solute gases and fine particulate matter and yet operating the apparatus with substantially decreased amounts of liquid, low energy and space requirements. It has been shown that the amount of liquid used by the improved gas reacting apparatus is only about 10% of that required by a suitable spray tower and only about 2% of that required by the venturi with comparable efficiency.

According to the invention, a gas stream containing solute gases or both solute gases and particulate matter is passed through a conduit and contacted while flowing through the conduit by at least two sprays of liquid or slurry, preferably injected countercurrent to the gas stream.

In the conduit, the liquid or slurry absorbing reacting medium is finely atomized by nonplugging, dual-fluid nozzles, which are preferably centrally disposed and spaced in series in the conduit to form two or more contact spray zones, and adapted to spray droplets in the range about 5 to about 100 microns, more usually about 5 to 30 microns. By spraying such liquids or slurries into a suitable reaction chamber, a tremendous number of droplets are generated along with very high surface area. For example, if only 5 micron droplets are generated, each kilogram of water yields about $1.5 \times 10^{13}$ droplets which have a surface area of about 120 square meters. On the other hand, in a traditional system, if only 1000 micron droplets are generated, each kilogram of water yields about $1.9 \times 10^6$ droplet which have a surface area of about 6 square meters. These surface area figures as shown above are by an order of magnitude greater than generated by the commercially-available devices presently used for this service. Since the mass transfer that a given dispersion can produce is often proportional to $(1/D)^2$, fine droplets are greatly favoured.

Upon intimate contact of the solute gas and particulate matter with the sprayed absorbing-reacting medium, transfer of the solute gas and particulate matter from the gas stream to the absorbing-reacting medium takes place. The removal of the solute gases so effected may be a purely physical phenomenon or may involve solution of the solute gas in a liquid or a slurry suspension, followed by chemical reaction with one or more constituents in the liquid or the slurry medium, to form a soluble by-product or a solid reaction by-product. The resultant liquid or slurry-laden gas stream is subsequently drawn into a slowly-turning fan that provides turbulent mixing and additional residence time plus an environment for continued absorption and reaction, and for efficient coalesence or agglomeration of the entrained, sprayed liquid or slurry and its subsequent removal from the system by a simple gravity drain in the fan casing. An entrainment separator is located downstream from the fan to complete the removal of agglomerated liquid phase (including slurries) from the system.

The apparatus of the invention may also include means for quenching and cooling a hot gas stream, such as that eminating from electric utilities or smelters, with an aqueous solution (water, or other liquids) prior to the removal of the solute gases.

The apparatus of the invention may also include an effluent hold tank for closed loop recycling of the absorbing-reacting medium and its regeneration with fresh make up feed, plus a pumping means to introduce the absorbing-reacting medium into the spray nozzles at the appropriate pressure.

Overall, what has been developed is an improved gas-reacting apparatus in which accelerated absorption and reaction of solute gases in an absorbing/reacting medium can be effected due to the large surface area, intimate contact, relatively long residence time, and turbulent mixing prevailing therein, thereby overcoming the problem of the prior art, as discussed above.

While the invention will be described further, particularly with reference to the removal of solute gases, either by absorption or absorption accompanied by chemical reactions, it is to be understood that the invention is also useful in the conduct of gas-gas reactions and subsequent wet separation of the resulting reaction product, in the removal of particulate matter, in the humidification of gases and in reaching a thermal equilibrium between a gas and a liquid.

In a preferred embodiment, the absorption, with or without accompanied reactions, is conducted in the improved gas reacting apparatus wherein the unexhausted reacting medium and the reaction products are agglomerated and thereby removed from the gas reacting apparatus as a coherent liquid or slurry mass, depending on the reacting system selected. In most instances the resulting slurry can be recirculated until some optimal concentration is reached, at which point a bleed stream can be removed for further treatment to recover product or for regeneration and recycling purposes, while fresh makeup feed is introduced into the system prior to recirculation.

In another embodiment, a gas stream containing solute gases and a gas reacting medium are introduced into dual fluid mixing nozzles of the type described herein having a pair of inlets, one for each incoming gas stream, and a common outlet. The confluence of the two streams in the nozzle creates turbulence which causes the two gas streams to intiately mix and react substantially instantaneously with each other thereby to produce reaction products which are in the form of a gas solute or finely divided solids. Wet separation of the above resultant reaction products is subsequently carried out as taught by the above preferred case.

One important feature of the improved gas-reacting apparatus resides in its ability to remove both solute gases and particulate matter simultaneously with high efficiency, due to the large effective interfacial surface area and the excessively large number of droplets introduced to the system, coupled with turbulent mixing and sufficient residence time that can be effected therein. Still another significant advantage of the improved gas reacting apparatus, particularly in comparison with the venturis of the prior art, is its ability to accommodate a very high turndown ratio through a simple adjustment of the gas-side pressure drop across the spray nozzles or the amount of liquid sprayed or both simultaneously. Yet another advantage is an ability to provide spray zones of uniform density and, therefore, to yield even gas distribution due to the nozzles being coaxially spaced apart in series within the conduit. The spray zones completely cover the cross sectional area of the conduit and yet without overlapping one another, thereby providing good gas and liquid distribution even under upset conditions associated with a nozzle failure. This is preferably achieved with a unique dual fluid, atomizing spray nozzle design of the type depicted in the drawings described below that has more precise gas-liquid mixture control and allows for the flexibility required to control size and number of droplets necessary for efficient removal of solute gases. The dual fluid spray nozzles generally operate at about 20 to about 100 psi, usually at about 20 to about 70 psi, preferably about 25 to about 55 psi. The cumulative results of the above-described advantages is a gas reacting apparatus which is more economical, more efficient, more compact and easier to handle than any other more conventional device. Also, being a relatively small piece of equipment it can be custom fitted/retrofitted or configured to meet various specific site requirements.

These and other characteristic features and advantages of the invention disclosed herein will become apparent and more clearly understood from the further description given in detail hereinafter with reference to the attached drawings which form a part thereof.

BRIEF DESCRIPTION OF THE DRAWINGS

FIG. 1 is a schematic sectional view of a gas reacting apparatus and its accessories having two separate single spray contact zones constructed in accordance with one embodiment of this invention;

FIG. 2 is an enlarged schematic sectional illustration of a preferred dual-fluid nozzle (Turbotak Caldyn type) used in the apparatus of FIG. 1;

FIG. 3 is a schematic view of a portion of the conduit shown in FIG. 1 illustrating a cluster nozzle incorporated into one contact spray zone and includes a sectional view taken on line C—C;

DESCRIPTION OF PREFERRED EMBODIMENTS

Figure 4:
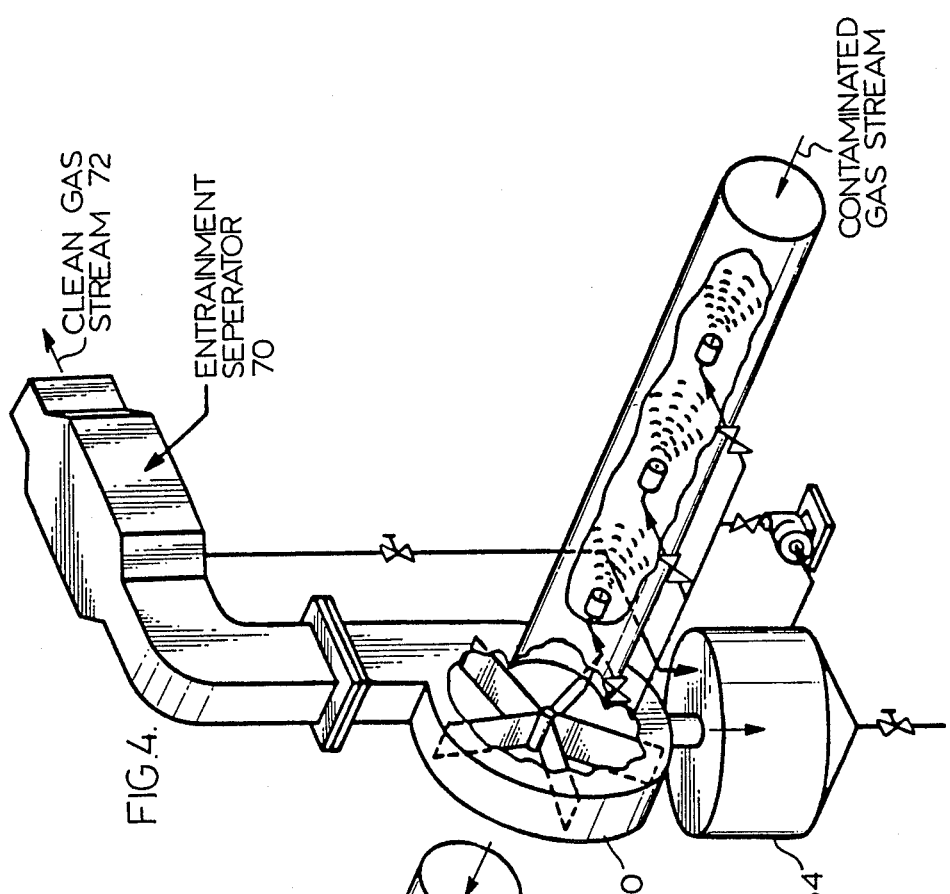
FIG. 4 is a perspective schematic view of the gas reacting apparatus of FIG. 1.

Referring to the drawings, the gas reacting apparatus 10 shown in FIG. 1 comprises in combination an elongated housing 12 defining a primary reaction zone and a fan 30 defining a post-reaction and coalescence zone.

The elongated housing 12 comprises a relatively straight conduit, preferably of circular cross-section, having an inlet 60 for introduction of gas stream containing solute gases alone or in combination with particulate matter and an outlet 62 at the other end for the entry of the resultant liquid or slurry-laden gas stream into the slowly turning fan 30. The conduit 12 may be positioned in any orientation with respect to the ground level. However, the generally-horizontal position or an orientation in which the conduit is positioned at a slight angle with respect to the ground level to permit gravitational flow through the conduit, are preferred.

Within the conduit 12 are positioned a number of atomizing spray nozzle means 14 for discharging liquid or slurry sprays countercurrent as illustrated (or cocurrent, if desired) to the gas stream flowing through the duct 12. The atomizing spray nozzle means 14 provide a very fine spray and are capable of delivering droplets in virtually any size distribution or quantity required. Typically, the range of about 5 to about 30 microns liquid droplets is preferred. By spraying liquid or slurry in the above droplet size range into the conduit 12 a tremendous number of droplets having a very large interfacial mass transfer area is produced. For example, if only 5 micron droplets are generated, each kilogram of liquid will yield about $1.5 \times 10^{13}$ droplets which have a surface area of about 120 square meters. These figures are orders of magnitude greater than generated by any other known contacting device.

In the preferred form as illustrated, liquid or slurry atomizing spray nozzle means 14 comprises dual fluid nozzles each capable of producing the above droplet size distribution. However, a Turbotak Caldyn dual-fluid nozzle (shown in FIG. 2) utilizing gas, i.e. air, steam, etc., to impart the energy required to atomize a liquid is very suitable for this purpose, particularly when using a slurry as a reacting medium. One of the features of the Turbotak Caldyn nozzle of the type shown in FIG. 2 is that erosion is virtually non-existent. This results because the liquid flow or the slurry flow is thought to be contained in an envelope of gas as it passes through the orifice of the device.

For maximum turbulent mixing and gas-liquid contact time, the scrubbing liquid or slurry preferably should be introduced at a sufficient nozzle pressure and velocity countercurrently to the gas stream to be scrubbed to form the desired spray pattern needed to cover substantially all of the cross-sectional area of the interior of the conduit 12 within a reasonable distance, e.g. 5 feet from the nozzle. The geometry of the spray issuing from the nozzles 14 and the exact orientation of the nozzles 14 with respect to the conduit 12, apart from being coaxially spaced, are not critical. However, for a circular conduit 12, nozzles 14 producing a conically-shaped spray pattern, preferably with a spray angle flow 15° to 90°, is the most advantageous to give adequate coverage of the conduit cross-section. To effect maximum hold-up of liquid and gas/liquid contact time, countercurrent flow is used and the atomizing gas pressure preferably should be high enough to impart to the liquid droplets sufficient force to overcome the velocity of the incoming main gas stream, so that no reversal of the sprayed liquid by the high velocity incoming gas stream can occur until a fully developed, conically-shaped spray pattern, with its extremity touching the conduit wall surface, is established, at which point the sprayed liquid is turned back by the incoming gas stream and becomes suspended therein. In this way, if all the energy expended in the sprayed liquid is transferred to the main gas with minimum loss to the conduit wall, a very high degree of turbulence results as the liquid and gas moving in opposite direction come together and the liquid is forced to reverse direction. This high degree of turbulence and increased liquid hold-up and liquid/gas contact time provides extremely efficient contact between liquid and gases to yield a very effective and accelerated mass transfer of solute gases to the absorbing/reacting medium.

The rate of the flow and pressure of air through the nozzle and thus the degree of atomization is controlled by a pressure reducing valve 22 connected by conduits 20 to the nozzles 14. Gas pressures in the range of about 20 to about 60 psi, preferably about 25 to about 50, is supplied to the nozzle by a conduit connected to a gas pressure source 23 through a gas regulator (pressure reducing valve) 22. Under such atomizing pressure conditions and a liquid usage of from about 0.25 to 1.0 U.S. gallon per 1000 acf (actual cubic feet) of gas treated, the Turbotak Caldyn dual fluid nozzle has been shown to be capable of generating liquid droplet sizes in the range of about 5 to about 100 microns with the majority of droplets having a size of about 5 to 30 microns.

For improved mass transfer operation, there may be a number of atomizing spray nozzles 14 employed within the conduit 12. The nozzles 14 are centrally disposed, countercurrently or cocurrently oriented to the gas flow, axially-spaced apart in series in the conduit and adapted to spray droplets primarily in the size range from about 5 to 30 microns, thereby creating a number of well back-mixed zones in the conduit 12. Such orientation of the nozzles results in very high turbulent mixing and high interfacial surface area for mass transfer. While, depending on the atomizing pressure employed, the spray nozzles preferably should be positioned and spaced apart in series in the conduit, so that the conically emerging spray patterns do not substantially overlap each other. Generally, in the above atomizing pressure range proposed, spacing of approximately four to eight feet was found to be adequate.

It has been found that the use of separated, spaced spray nozzles 14 to provide at least two separate gas/-liquid contact spray zones in which oppositely moving sprayed liquid and gas come together and the sprayed liquid is forced to reverse direction, provides for removal of typically over 99% of the sulfur dioxide and over 99.6% of the particulate matter from a synthetic gas stream when scrubbing with aqueous caustic solution of 0.5M. This high efficiency is accomplished with the use of about 0.5 USG per 1000 acf of gas treated which is only 10% of that required by most scrubbers with comparable efficiency.

An important feature of the scrubber apparatus of the present invention resides is its low energy requirement. The approximately 1 to 5 H.P. expended into the liquid per 1000 acf of gas treated and a gas pressure drop of 0"±W.G. measured across the device are considered to be very low. To accomplish similar removal effects by mechanically increasing the gas flow rate by means of blowers pulling through a venturi throat involves greater energy coupled with inferior results.

Another significant advantage of the gas reacting apparatus of the present invention, particularly in comparison with systems of the prior art, is its ability to accommodate a high turn-down ratio when the flow of the gas stream is decreased because of decreased boiler load without the need for adjustments by moving parts. As can be seen from FIG. 1, the turndown capability of the gas reacting apparatus is not affected by some mechanical limitation. In the gas reacting apparatus of the present invention, the interfacial area is not dependent on the gas flow rate or the pressure drop. Hence, the solute gas removal efficiency increases with reduction in gas flow. One method to regulate make-up feed rate is by controlling the effluent pH. Here a pH electrode probe activates a signal that regulates the position of control valve 53 to control the rate of make-up feed through line 55. Other make-up feed control system may be used, such as controlling the inlet gas flow and solute gas concentration or controlling the outlet solute gas concentration as the control variable.

Although the gas reacting apparatus has been described with reference to single orifice spray nozzles creating separate spraying zones, it is desirable and practical in large scale applications where conduits of large diameter are used to substitute for the single spray nozzles with a multiple orifice nozzle (i.e. a cluster nozzle) with a combined spray pattern which substantially covers the cross-section of the conduit in order to obtain maximum effectiveness and space utilization. A schematic view of portion of the conduit illustrating a cluster nozzle incorporated into one contact zone is shown in FIG. 3.

The apparatus 10 of the present invention also comprises a low speed, motor driven fan 30 downstream from the last spray nozzle 14. The fan 30 is connected to the outlet of the conduit 12. In particular, fan 30 is of the radial-blade centrifugal type and comprises a shaft 32 having a bladed wheel 34 fixed thereto, the shaft and the bladed wheel being coaxially positioned or supported in a volute casing 36. In particular, fan wheel 34 (impeller) comprises a disc shaped member 37 fixed to the shaft 32, a plurality of blade members 38 extending from the disc 37 and equally-spaced around the shaft 32, and an annular rim 39 fixed to the edges of blades 38 and disposed in a plane parallel to the plane of the disc 37. This type of structure, as shown in FIG. 1, was found to be self-cleaning and particularly suitable for severe duty. Other impeller types, such as the forward curved, backward curved or inclined structures, may be used but are not considered to be as suitable as the simple radial-bladed fan illustrated.

The casing of the fan 30 is formed to include an inlet 40 having an inner diameter smaller than the diameter of annular element 39. Inlet 40 is connected to the open end of conduit 12, and an annular joint 41 is provided to seal the connection. The fan opening preferably should be sized to match the size of the conduit or vice versa. However, a tapered inlet 40 or a conduit gradually growing smaller toward the inlet of the fan 30 can also be employed, causing the compressible part of the gas stream to speed up, either at the hub of the fan or in the conduit while the incompressible part of the gas stream, i.e. "fly ash" and liquid droplets, slows down, relative to the velocity of the gas. The increase in the relative velocity between the two phases results i lower gas phase resistance and thus better scavenging action against solute gas by liquid droplets. Also, the larger differences in velocities of the liquid droplets and the gas occur in such tapered inlet caused impaction and results in better scrubbing action against particulates. Another method to improve the turbulent mixing at the inlet to the fan is by the use of variable guide vanes to impart pre-rotation to the incoming gas stream in an opposite direction to that of the impeller rotation.

The fan drive shaft 32 is connected to the drive means in the form of an electric motor 42 for rotating shaft 32 and fan wheel 34 at a relatively low speed. The motor also includes suitable means 43 for maintaining the speed in a desired range. Fan 30 also includes means in the form of an gas exhaust passage from fan 30. Exhaust passage 44 is at the upper portion of casing 36 as viewed in FIGS. 1 and 4 and is connected to one end of an output duct 46 for exhausting clean gas from the apparatus. The connection of passage 44 to duct 46 is sealed by a joint 47. Fan 30 further includes means in the form of an opening 48 provided in volute casing 36 at the lower end, as viewed in FIGS. 1 and 4, for removing or collecting sprayed liquid and particulate matter separated from the gas stream. Opening 48 is in fluid flow communication with a relatively short conduit or passage 52, disposed generally vertically into a sludge trap in the form of an open top tank 54. In slurry-based operation, the tank preferably should include an agitator means (not shown in FIG. 1) to keep the solids in suspension. The tank 54 preferably should include absorbing/reacting liquid 56 up to a level above the bottom of the tube 52. In some cases, it may be desirable to exhaust both the clean gas and the absorbing/reaction-liquid from the same exhaust passage 44 for subsequent separation. Such an arrangement is shown in FIG. 5.

The distance between the last spray nozzle 14 and inlet to the fan 30 is not critical when the nozzle is countercurrently-oriented to the main gas stream flow. However, in applications where the nozzle is directed cocurrent to the gas stream flow, a minimum distance upstream from the intake of the fan 30 generally is required to permit the conically-shaped spray to fully develop and fill completely the cross-section of the conduit 12. In general, a distance of four feet or less has been found to be satisfactory.

The fan 30 also provides means to withdraw and move the gas stream and to overcome the pressure losses across the apparatus. In the fan, there is provided turbulent mixing and additional residence time plus environment for continued absorption and effective coalescence of the liquid droplets and their removal from the system. Much turbulence can also be effected in countercurrent operation as oppositely moving liquid droplets suspended in an atomizing gas and the main gas stream come together and the liquid droplets are forced to reverse direction and to pass through at least two spray contact zones formed by two or more spray nozzles.

The liquid-laden gas is drawn into the vortex of the slowly-turning fan 30 in the direction indicated by arrow 62 from which the solute gas-laden droplets and the collected particulate matter exit into the liquid or sludge trap provided by opening 48 at the bottom of fan 30, as viewed in FIG. 1. Clean gas and some entrained droplets not removed by the fan, exit through the fan exhaust opening 46. The majority of the liquid droplets first coalesced in the vortex created by the fan 30 grow in size and then impinge and constantly coat the fan blades 34, to form a layer of coalesced liquid and solids that adheres to the rotary fan blades and is separated from them mostly on the edges of the blades by the effects of centrifugal force, moving outwards in so doing so as to form an attendant annular coarse spray zone to further remove solute gas and particulate matter. The liquid droplets adhering to the blades run over the blades, washing them of collected particles.

The particulate matter and solute gas-laden liquid is collected as it reaches the fan housing 36 and draws by gravity into a sump 54 through a sealed drain 50. Because the impeller 34 and the fan casing 36 are not coaxially aligned, the annular space between the impeller and the fan casing increases toward the exhaust opening, thereby preventing any blockage and interference with the clean gas throughput capacity by the sprayed liquid. Within the sprayed annular zones formed as a result of centrifugal force imparted on the liquid coating the blades the main gas stream that has been agitated by the impeller 34 comes into intimate contact with the reacting liquid discharged from the blades 34, so that for all practical purposes, additional removal of solute gases remaining in the gas stream continues to take place.

The flow of clean gas with some entrained liquid droplets not removed by the fan, continues through the exhaust ducting 46 in the direction of arrow 64, from which it can be discharged directly to the atmosphere or into an entrainment separator for final removal of the entrained liquid droplets. It was found that the fan, upon rotating forward, can separate 85 to 90% of the liquid droplets suspended in a gas stream while backward rotation can separate some 95% of the suspended liquid. Therefore, for gases containing heavy dust loadings or where a higher overall removal efficiency is required, a backward turning fan normally is recommended, although the lower flow rate and static pressure may necessitate either a larger fan or a booster fan in the system.

The provision of the fan, which constitutes an integral part of the gas reacting apparatus, makes it possible to use the same elements that serve to move the gas and coalesce the liquid droplets also to provide the turbulent mixing, additional residence time plus mass transfer areas for continued absorption of solute gases and removal of particulate matter from the gas that is to be treated.

Figure 5:
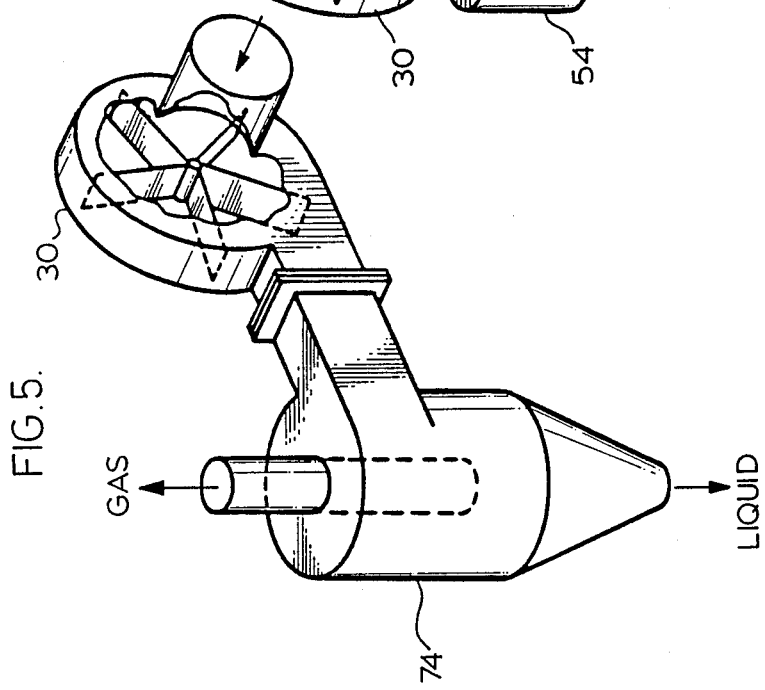
FIG. 5 is a perspective schematic view of an alternative fan arrangement used with the apparatus of FIG. 1 and having a common exhaust outlet for both gas and coalesced liquid.

The entrainment separator 70 shown in FIG. 4 to which the clean gas is discharged from the fan 30 is used to separate entrained liquid not separated by the fan 30. Typically, a Chevron-type separator which may be followed by a special mist eliminator packing (Kimre preferred) both contained in the same housing were found sufficient to clean the gas of any suspended liquid. The clean gas then is discharged to the atmosphere via duct 72 at 100% relative humidity, but virtually free of liquid water content.

A fresh make up of reacting medium feed is added to a recirculation tank 54 through line 55. From the tank 54, the scrubbing material is drawn through a pump 17 and is introduced into the atomizing spray nozzles 14. Reacting liquid recovered from the clean gas by the fan 30 and the entrainment separator 70 is returned to tank 54 for reuse, while spent scrubbing liquid is discharged through line 57.

Since gas flow in the gas reacting apparatus 10 is unrestricted, pressure drops are low, typically not exceeding 2 inches W.G. This pressure drop is normally picked up by the fan so that typically, the pressure drop across the system, flange to flange, is zero inches W.G. If desirable, the fan can also pick up system pressure drops up to about 6 to 8 inches W.G.

FIG. 5 illustrates an alternate fan arrangement in which a venturi 74 is used to effect separation of gas and liquid drawn into the fan 30.

Figure 6:
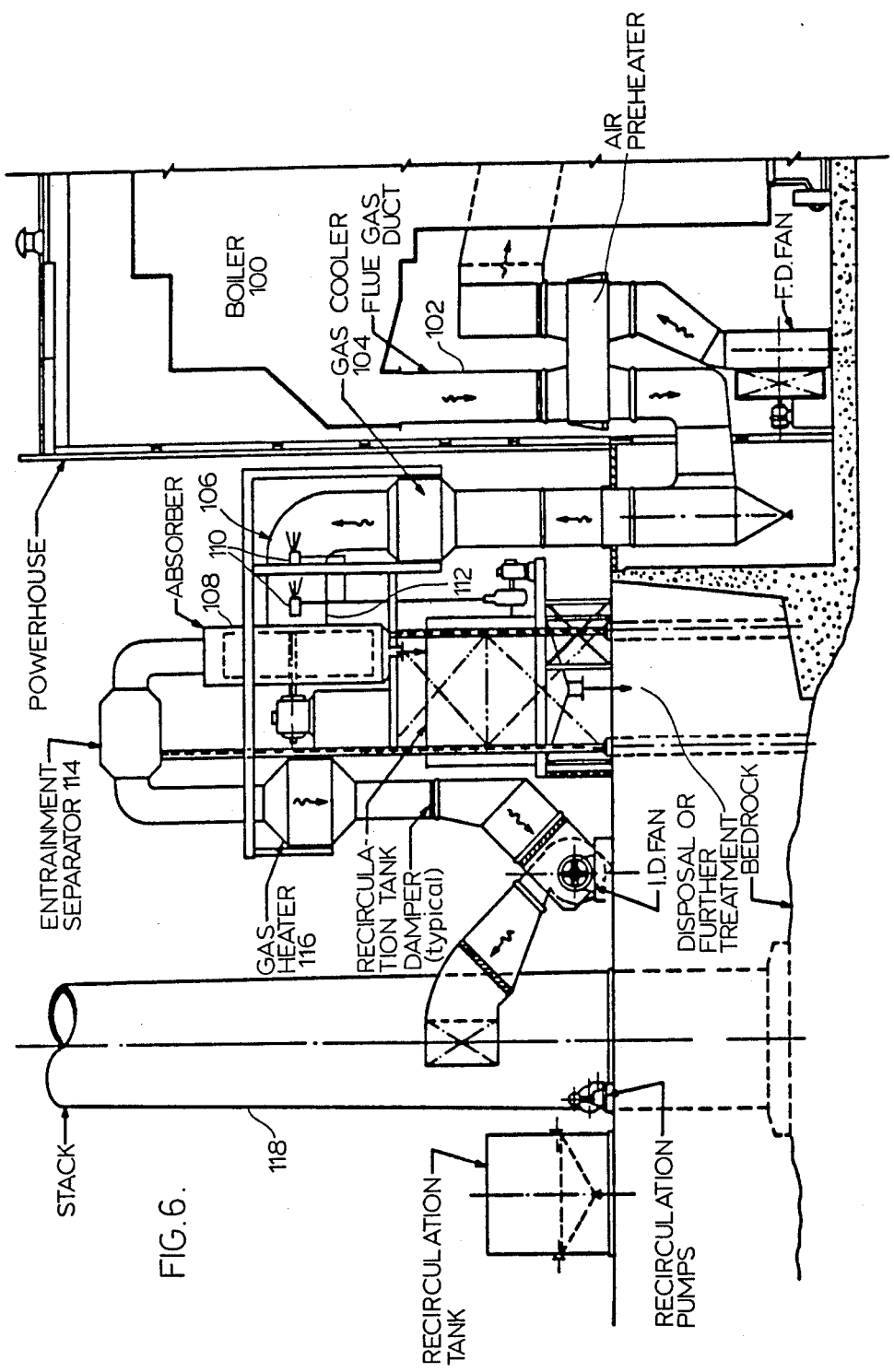
FIG. 6 is a schematic representation of the application of the present invention to a typical coal or oil-fired boiler exhaust gas stream for the removal of gaseous pollutants and fly ash.

Referring to FIG. 6, there is illustrated therein the application of the present invention to a typical coal- or oil-fired boiler exhaust gas for the removal of $SO_2$ therefrom.

As seen, the method lends itself to the use of existing ductwork and I.D. fan, depending on the layout of these in an available plant. Constraints of residence time and temperature of a particular application determine whether the existing layout is practical.

As shown in FIG. 6, the gas originating in a flue gas duct 102 from a boiler 100 and exiting gas coolers 104 at temperatures normally ranging up to about 250° C., but not limited to this range, enters a scrubbing area 106 for simultaneous $SO_2$ and fly ash removal using the procedures described above. Adjacent the inlet of the fan 108 a scrubbing medium is injected countercurrently into the incoming flue gas stream through injection 110 to form at least two separate scrubbing zones covering the cross-sectional area of the duct 112 adjacent to the fan 108 whereby the flue gas is scrubbed. After separation of the suspended liquid from the gas by the fan 108 and a downstream entrainment separator 114 and further reheating by gas heater 116, a clean gas is discharged to the atmosphere through stack 118. Quenching sprays (not shown in FIG. 6) also may be incorporated where the flue gases are hot to serve to cool and saturate the gas stream with water vapour prior to scrubbing.

Figure 7:
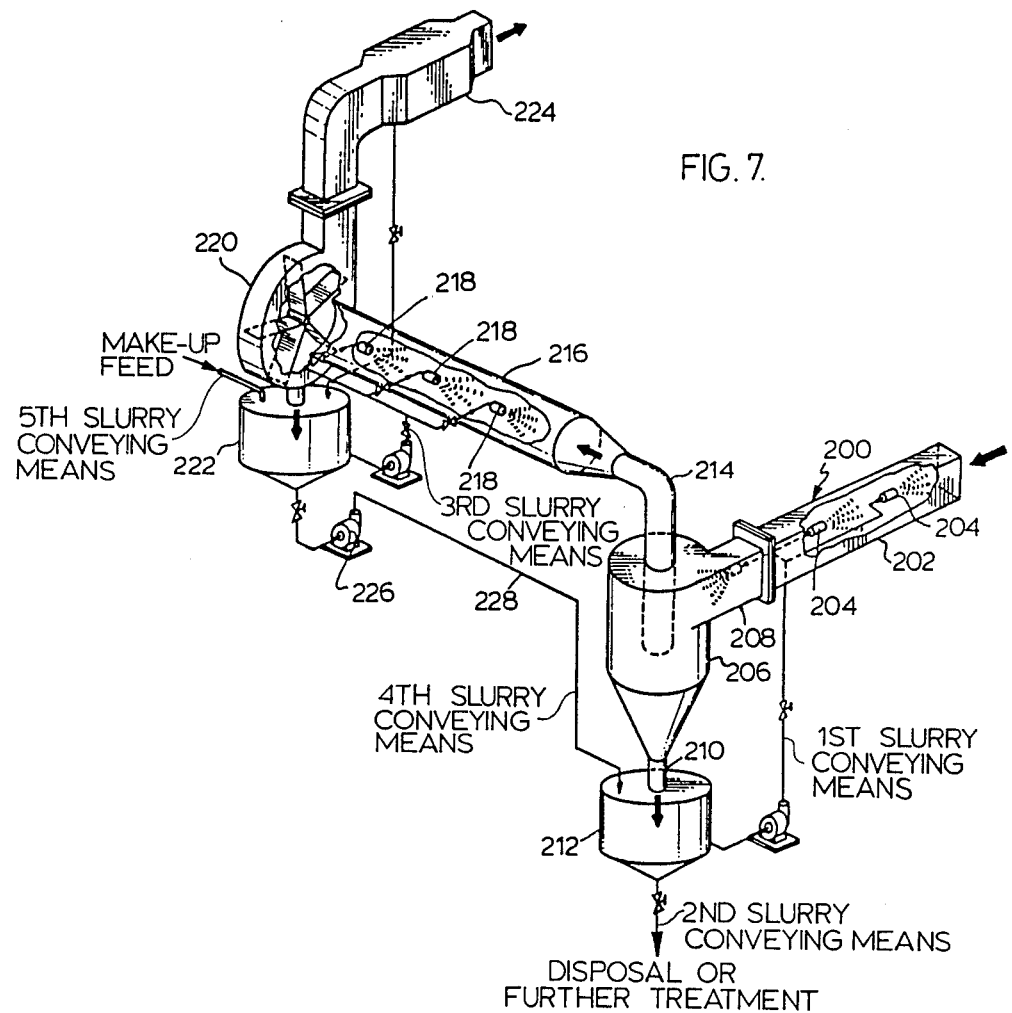
FIG. 7 is a perspective, schematic representation of an alternative embodiment of a gas reacting apparatus of the invention illustrating a double-loop approach to absorption of solute gases with low reacting medium.

Referring now to FIG. 7, there is shown therein a perspective schematic view of a double-loop slurry approach to effect better utilization of slow reacting solids in suspension such as limestone or iron oxide. The use of a double-loop slurry procedure offers greater flexibility because extreme operating conditions can be segregated into discrete areas of the double loop system, allowing separate chemical and physical conditions to be maintained. In the double loop slurry procedure illustrated in FIG. 7, a low pH slurry solution contacts the entering gas stream in an initial reacting loop 200 comprising an elongated conduit 202 and a plurality of atomizing spray nozzles 204 centrally disposed and spaced apart from each other in the conduit 202, and adapted to spray slurry into an incoming gas stream whereby some solute gas removal takes place. The slurry-laden gas stream exits from the conduit 202, and enters a hydrocyclone 206 via a tangential inlet 208 and swirls down about the vortex finder. The swirling separated slurry concentrate flows down the cone section to the apex opening 210 which is sealed by a joint to the top of a vertically disposed conduit, the other end of which terminates in a sludge effluent hold tank 212. The slurry-free, partially-clean gas passes upwards through the vortex finder to the outlet 214, then to another conduit 216 which is part of a second reacting loop designed for almost complete removal of the remaining solute gas.

In the second loop, a high pH slurry or solution is contacted with the partially clean gas in the conduit 216, where the bulk of the solute gas removal takes place. The second loop comprises an elongated conduit 216, a plurality of spray nozzles 218 coaxially disposed in series to form a number of reacting zones, a fan 220, an effluent hold tank 222 and an entrainment separator 224. Spent slurry from this loop is discharged to first loop via pump 226 and line 228 where the unused reagent is consumed, thereby proving efficient reagent utilization. Fresh make-up reagent need be added only in the second reacting loop.

This type of design, incorporating two reacting loops in conjunction with the gas reacting apparatus of the present invention, takes advantage of the concept of contacting a gas stream containing the highest solute gas concentration with the lowest liquor alkalinity in a first loop to effect good reagent utilization and relatively low solute gas removal and the highest liquor alkalinity with the lowest solute gas concentration in a second loop to effect poor reagent utilization, but good solute gas removal. The reduced solute gas removal in the low pH loop (lower alkalinity) is more than offset by improved performance of the high-pH loop (higher alkalinity).

EXAMPLES

The following specific Examples illustrate the use of the gas reacting apparatus of the present invention for the purpose of removing $SO_2$ from synthetic gases by NaOH and $NH_3$ aqueous solutions and a lime slurry containing MgO.

EXAMPLE I

This Example illustrates the use of the gas reacting apparatus of FIG. 1 for the purpose of removing $SO_2$ from a synthetic gas stream containing about 1100 ppm $SO_2$, 21%V $O_2$ and the balance nitrogen, by absorption into aqueous NaOH solution of sufficient concentration of active sodium alkalinity.

In this type of removal, absorption accompanied by chemical reaction takes place between the $SO_2$ and NaOH to form soluble sodium-based sulfite, bisulfite and sulfate compounds, which effectively traps $SO_2$ in the solution. With the caustic system having an initial active sodium concentration of 0.3M (pH 12.4), a liquid-to-gas ratio of 1.0 USG per 1000 acf of gas treated and a ratio of active molar concentration of sodium to moles of $SO_2$ inlet of 1.2:1, 99% $SO_2$ removal was effected. To effect the same degree of $SO_2$ removal but at a lower pH of 6.2, a L/G ratio of 4.75:1 was required.

When the concentration of the aqueous NaOH solution was increased to 0.5M active Na (pH 12.5), a liquid-to-gas ratio as low as 0.5 USG per 1000 acf of gas treated was required to operate the reactor to effect 99% $SO_2$ removal. These results were obtained by using three spray nozzles in series to form three separate reacting zones within a single conduit. The nozzles were oriented countercurrently to the gas stream flow. The pressure drop across the conduit was less than 2 inches W.G. during these tests.

EXAMPLE II

This Example further illustrates the use of the gas reacting apparatus of Fogire 1 for the removal of $SO_2$ from synthetic gas stream containing about 1100 ppm $SO_2$, 21%V $O_2$ and the balance nitrogen, by scrubbing with an ammoniacal solution.

The $SO_2$ removal efficiency averaged well above 95% which was maintained at this level as long as the $NH_3$-to-$SO_2$ feed stoichiometry was higher than 1.9:1. With an $NH_3$-to-$SO_2$ feed stoichiometry of from 1.8 to 2.0:1, the effect of liquid flow rate on $SO_2$ removal over the range of liquid rates of 0.005 to 0.5 USGM (corresponding to a L/G ratio range from 0.17 to 1.15) was observed to be minor and in general high removal efficiencies were obtained ranging from 95 to 99%.

In these tests, the ammonia gas feed to the system was introduced with the atomizing gas (air) into three pneumatic, dual-fluid nozzles coaxially disposed in series in a conduit and using recycled scrubbing liquor as the liquid phase. It was observed that the high turbulence, swirling and pressure conditions prevailing at the nozzles enhanced substantially the chemisorption of the ammonia in the sprayed liquid phase.

In this method of ammonia injection, there was also evidence of substantial suppression of a plume (commonly associated with ammonia scrubbing operations) exiting the apparatus in all of the tests so conducted and it may have been due to the manner in which the gaseous ammonia was admitted to the system.

The Table below shows the $SO_2$ removal efficiency obtained as a function of the reactor outlet pH and $NH_3/SO_2$ stoichiometry employed at an L/G of about 1.0 USG per 100 acf of gas treated.

TABLE

| $NH_3/SO_2$ Stoichiometry | Reactor pH | $SO_2$ Removal Efficiency |
| --- | --- | --- |
| 1.09 | 3.9 | 55 |
| 1.24 | 5.4 | 81 |
| 1.52 | 6.6 | 92 |
| 1.89 | 7.4 | 95 |
| 2.00 | 8.5 | 99 |

EXAMPLE III

This Example further illustrates the use of the gas reacting apparatus of FIG. 1 for removal of $SO_2$ from a synthetic gas stream using a lime slurry containing MgO. In this case a dolime assaying 35.9 wt % Ca and 20 wt % in the form of a finely divided powder, was slaked to give a slurry of some 1.9 wt % solids loading.

A synthetic gas stream containing about 1200 to 1400 ppm $SO_2$ and 21%V oxygen was produced at the rate of 550 to 650 acfm by adding $SO_2$ gas from cylinders to the inlet air stream. The scrubbing temperature of the gas was ambient.

The system was operated in a recirculating mode during which continuous addition of make up dolime slurry was added at the rate of 0.32 lb/min for 145 minutes to provide for the required stoichiometric amount of alkalinity and to maintain the recycled tank pH at a prescribed level of between 6.0 and 7.0. Under such pH conditions, it was found that high a concentration of dissolved alkalinity as magnesium sulfite in the reacting liquor occurred, resulting not only in a well-buffered reacting solution but also in a scale-free operation of high reliability.

$SO_2$ removal of 95 to 97% was achieved with the gas reacting apparatus at gas-to-liquid ratio of 4.5 gal/$10^2$ acf. This scrubbing efficiency remained close to the above values for the duration of the test.

Operating experience with the gas reacting apparatus of FIG. 1 using different commercially available reacting agents has shown that, for most of the systems studied, under optimal pH conditions and reagent concentration, an L/G of only 1 to 5 USG per 1000 acf of gas treated appears to be adequate to maintain uniformly and consistently high $SO_2$ removal. For reactive systems, such as the sodium and ammoniabased systems, the apparatus provides excellent $SO_2$ gas removal in excess of 99% and, if necessary, also efficient simultaneous removal of particulate matter in excess of 99.6%, and yet permitting a liquid-to-gas ratio in the range from 0.17 to 0.5 USG per 1000 acf of gas treated.

This low L/G ratio requirement employed by the gas reacting apparatus of the invention should not only reduce both capital and operating costs to a fraction of the costs related to traditional removal devices, but should also enable easy integration into flue gas ductwork of existing oil or coal-fired boilers due to its compact size. As shown particularly in FIG. 6, the apparatus of the invention can be configured to easily meet site requirements.

SUMMARY OF DISCLOSURE

In summary of this disclosure, the present invention relates to the gas/liquid, gas/liquid/solid and gas/gas/liquid mass transfer art and more particularly to an improved method and gas reacting apparatus for wet mass transferring of solute gases from process gas streams into a liquid or slurry reacting medium, wherein the mass transfer operation may be a purely physical phenomenon or may involve solution of the material in the absorbing liquid or slurry, followed by reaction with one or more constituents in the absorbing liquid or slurry medium.

The improvement provides an apparatus in which accelerated absorption and reaction of solute gases can be effected as a result of the large interfacial surface area for mass transfer, plurality of reaction zones, intimate contact, increased residence time and turbulent mixing prevailing therein.

While an improved apparatus and method have been described in detail, various modifications, alterations and changes may be made without departing from the spirit and scope of the present invention as defined by the appended claims.

What we claim is:

1. A continuous system for mass transferring solute gases from a process gas stream into a slowly reacting slurry medium, comprising, in combination:

(a) a first reacting loop system comprising a first elongated conduit means having an inlet end and an outlet end and a first plurality of gas atomizing spray nozzle means centrally disposed and spaced apart from each other in said first conduit mean a and arranged to spray a low-pH finely-divided slurry into a gas stream passing through said first conduit means from said inlet end to said outlet end, whereby only a portion of solute gases is removed by a low-pH recirculating slurry medium to provide good utilization of solid reagent therein, first tank means, first slurry conveying means of or recycling low-pH slurry medium through said first loop system from said first tank means to said first plurality of gas atomizing nozzle means, and a second slurry conveying means for bleeding off spent slurry, and hydrocyclone means connected to the outlet end of said first conduit means and further connected in liquid flow communication with said first tank means to separate entrained slurry from a partially-cleaned gas stream passing out of said outlet end from said first elongated conduit means, and to permit the separated slurry to flow down said hydrocyclone means to said first tank means;

(b) a second reacting loop system comprising a second elongated conduit means having an inlet end in gas flow communication with a gaseous outlet from said hydrocyclone means and a second plurality of gas atomizing spray nozzle means centrally disposed and spaced apart from each other in said second conduit means and arranged to spray recirculating high-pH finely-divided slurry medium into the partially-cleaned gas stream to form a number of contact reacting zones whereby solute gas remaining in the partially-cleaned gaseous stream is removed by a high-pH recirculating slurry medium to provide low utilization of the solid reagent therein, second tank means, third slurry conveying means for recycling high-pH slurry medium through said second reacting loop system from said second tank means to said second plurality of gas atomizing spray nozzle means, fourth conveying means for conveying partially-reacted, high-pH slurry solution to said first tank means whereby the unused reagent is consumed to provide good reagent utilization, fifth conveying means for conveying fresh make-up feed slurry to said second tank means, fan means in flow communication with an outlet end of said second conduit means and entrainment separator means in communication with said fan means, both for separating entrained slurry from the clean gas stream exiting said second conduit means for further recycling and continued removal of solute gases, with the clean gas stream being discharged to atmosphere;

whereby said gas stream containing the highest solute gas concentration is contacted with the lowest liquor alkalinity in said first loop reacting system to effect reagent utilization but low solute gas removal efficiency, and the highest liquor alkalinity is contacted with the lowest solute gas concentration in said second loop reacting system to effect low reagent utilization but good solute gas removal efficiency.

2. The system of claim 1 wherein said first and second loop reacting systems are separated on liquid spray circuits so as to use two distinct reagents to treat the solute gas, in said first loop reacting system an economic reagent being used to effect major reduction in solute gas concentration and in said second loop reacting system a lesser amount of a more expensive reagent being used for maximum final reduction in solute gas concentration.

3. The system of claim 1 wherein two or more loop reacting systems are separated on liquid spray circuits so as to use two or more distinct reagents to treat two or more distinct solute gases.

* * * * *